(12) United States Patent
Whetton

(10) Patent No.: US 11,693,147 B2
(45) Date of Patent: Jul. 4, 2023

(54) METHOD OF AND APPARATUS FOR DETERMINING COMPONENT WEIGHT AND/OR VOLUME FRACTIONS OF SUBTERRANEAN ROCK

(71) Applicant: Reeves Wireline Technologies Limited, Leicestershire (GB)

(72) Inventor: James Anthony Whetton, Nottingham (GB)

(73) Assignee: REEVES WIRELINE TECHNOLOGIES LIMITED, Leicestershire (GB)

( * ) Notice: Subject to any disclaimer, the term of this patent is extended or adjusted under 35 U.S.C. 154(b) by 223 days.

(21) Appl. No.: 16/862,334

(22) Filed: Apr. 29, 2020

(65) Prior Publication Data

US 2021/0003737 A1 Jan. 7, 2021

(30) Foreign Application Priority Data

May 8, 2019 (GB) ...................................... 1906490

(51) Int. Cl.
*G01V 5/10* (2006.01)
*E21B 49/08* (2006.01)
*G01V 99/00* (2009.01)

(52) U.S. Cl.
CPC .......... *G01V 5/104* (2013.01); *E21B 49/0875* (2020.05); *G01V 99/005* (2013.01)

(58) Field of Classification Search
None
See application file for complete search history.

(56) References Cited

U.S. PATENT DOCUMENTS

| 2002/0133323 A1* | 9/2002 | Dahlberg | G01V 3/38 |
| | | | 703/10 |
| 2010/0004867 A1* | 1/2010 | Zhou | G01V 5/12 |
| | | | 250/269.3 |

(Continued)

OTHER PUBLICATIONS

Pemper, R., Sommer, A., Guo, P., Jacobi, D., Longo, J., Bliven, S., Rodriguez, E., Mendez, F., and X. Han. "A New Pulsed Neutron Sonde for Derivation of Formation Lithology and Mineralogy." Paper presented at the SPE Annual Technical Conference and Exhibition, San Antonio, Texas, USA, Sep. 2006. (Year: 2006).*

(Continued)

*Primary Examiner* — Lina M Cordero
(74) *Attorney, Agent, or Firm* — Cabello Hall Zinda, PLLC

(57) ABSTRACT

Component weight and/or volume fractions of subterranean rock are determined. A formation model generates mineral and fluid concentration data from which elemental concentrations are calculated. Forward modeling produces a simulated energy spectrum, and simulation produces a simulated constraining log. Spectra is generated by detecting gamma radiation with a neutron logging tool, and a constraining log is generated. The spectrum and the simulated energy spectrum are compared with resultant error determined. The constraining log and simulated constraining log are compared with resultant error determined. The formation model generates further mineral and fluid concentration to calculate further elemental concentrations. Forward modeling produces further simulated energy spectrum signal and further constraining logs. The spectrum signals and further simulated spectrum signal are compared with resultant error determined. The constraining log and further simulated constraining log are compared, and resultant error is determined. The mineral and fluid concentration are selected that result in minimal error.

22 Claims, 7 Drawing Sheets

(56) References Cited

U.S. PATENT DOCUMENTS

| | | | |
|---|---|---|---|
| 2010/0228485 A1* | 9/2010 | Betancourt | G01V 11/00 |
| | | | 702/13 |
| 2010/0312479 A1* | 12/2010 | Khisamutdinov | E21B 47/11 |
| | | | 250/262 |
| 2013/0013209 A1* | 1/2013 | Zhu | G01N 33/24 |
| | | | 702/6 |
| 2015/0081265 A1* | 3/2015 | Kauerauf | G01V 99/005 |
| | | | 703/10 |
| 2016/0003969 A1* | 1/2016 | Zhou | G01V 5/101 |
| | | | 250/269.6 |
| 2016/0230548 A1* | 8/2016 | Gzara | G01V 3/32 |
| 2016/0349398 A1* | 12/2016 | Zhou | G01V 5/10 |
| 2017/0160425 A1 | 6/2017 | Miles et al. | |
| 2018/0058211 A1* | 3/2018 | Liang | G01V 1/282 |
| 2018/0210110 A1* | 7/2018 | Stephenson | G01V 5/101 |
| 2019/0094409 A1* | 3/2019 | Mendez | G01V 5/125 |
| 2019/0204471 A1 | 7/2019 | McKeon et al. | |
| 2021/0173115 A1* | 6/2021 | Galford | G01V 5/06 |

OTHER PUBLICATIONS

Search Report received in copending UK Application No. GB1906490.6 dated Nov. 7, 2019, 1 page.

\* cited by examiner

METHOD OF AND APPARATUS FOR DETERMINING COMPONENT WEIGHT AND/OR VOLUME FRACTIONS OF SUBTERRANEAN ROCK

FIELD OF THE DISCLOSURE

The disclosure hereof relates to a method of and apparatus for determining component weight and/or volume fractions of subterranean rock. The disclosure also relates to a borehole-apparatus system as described herein.

Embodiments disclosed herein relate generally to the field of geological logging. Within this field the determination of component weight fractions is an important endeavor.

BACKGROUND OF THE DISCLOSURE

In broad terms, logging typically involves inserting a logging tool, that in most cases is an elongate, rigid cylinder, into a borehole where the logging tool generates log signals that are indicative of the geological and other characteristics of the environment surrounding the borehole.

Parameters of the signals are formed into logs which are ordered collections of signals, parts of signals and/or information, representing downhole conditions and constituted by or derived from the log signals. Depending on their exact nature such logs maybe stored, transmitted, further processed, displayed or printed and they may be represented as mathematical models or functions, collections of data values or various forms of graphical image including colored plots and graph traces. The essence of a log however is a plurality of physical signals, and references herein to "log data" generally are references to such signals (or parts or derivatives of signals), either in their as-created forms or following conversion in some way. A non-limiting example of such conversion is the generation of electrical log signals in a photomultiplier tube that detects gamma radiation following irradiation of subterranean rock by a neutron burst from a source forming part of a logging tool.

Logging is extensively used in the oil and gas industries, for example to identify regions of rock that bear hydrocarbons the recovery of which is desired. It further is used in such industries to identify regions of geology that may be problematic from the standpoint of rock stability, ease of drilling, water (or other chemical) injection and various aspects associated with the production of hydrocarbons.

Logging also is of use in the identification of subterranean sources of other chemicals, including water such as groundwater, or to help locate regions that are likely to be good sources of geothermal energy; and additionally in other branches of mineral recovery such as shaft and open-cast mining.

Logging moreover is of use in the mining, construction and tunneling industries when for example it is desired to establish the stability of rock or the relative ease with which it can be drilled, cut, detonated or dug.

Yet a further application of logging is in the "carbon capture" industry in which carbon dioxide that otherwise would escape into the atmosphere may be stored in subterranean locations where it does not influence the climate systems of the Earth. Logging may be used to assess the suitability of underground locations for this purpose.

Logging is economically an important activity. The process of logging is of high commercial value; and it often is key to promoting higher value activities associated with e.g. production from an oil or gas field.

The invention is of use potentially in all such applications of logging, although it is likely to be of greatest use in the logging of oil and gas fields.

Many boreholes are formed e.g. by drilling downwardly, either vertically downwardly or inclinedly downwardly, into rock such as the ground or a seabed; but it is also well known to create boreholes that extend predominantly horizontally, e.g. sideways into a subsurface geological structure.

Logging techniques have been developed for logging a great variety of borehole types and designs. Embodiments disclosed herein are useful in the logging of a wide range of boreholes.

Usually the generated log signals are electrical signals, although this is not always the case. Electrical log signals can be transmitted to a surface location for example using wireline (i.e. elongate, armored cabling that connects the logging tool to a surface location and permits the transmission of log data signals, commands and electrical power between the logging tool and the surface location or vice versa).

Alternatively the logging tool may be of a type that includes an on-board power source and a memory for recording the log data signals. This type of logging tool completes a logging operation before being recovered to a surface location at which the log data are downloaded, typically as electrical signals, for processing and analysis.

The deployment of logging tools to their downhole, operational locations (the terms "downhole" and "uphole" being familiar to those of skill in the art) may take place in a variety of ways as is known. Logging normally takes place while a deployed logging tool undergoes movement, that may not be continuous movement, in an uphole direction towards a surface location, although it is also known for logging to take place while logging tools are being deployed in a downhole direction. It further is known (and in some cases is essential) for logging to take place while a logging tool is stationary in a downhole location.

Logging in the majority of cases involves causing a logging tool inserted in a borehole to emit energy into the surrounding rock. The energy passes from the point(s) of emission to one or more receivers of energy that are spaced from the emission point(s). In most, but not all, cases the receivers are spaced along the body of the logging tool from one or more energy emitters.

An aim in many types of logging is to cause the emitted energy to pass through the surrounding rock before it encounters the receivers. The passage of the energy through the rock alters its character. The receivers are sensitive to the received energy and are arranged to generate signals that are characteristic of it.

Such signals imply information about conditions such as the physical and chemical properties encountered by the energy on the path(s) between the emitter(s) and the receivers.

One form of logging to which the disclosure particularly pertains is nuclear spectroscopy. The aim of this branch of logging is to derive elemental and mineral weight and/or volume fractions (also referred to generally as component fractions) making up the lithology surrounding the borehole. These terms are familiar to the person of skill in the art.

In nuclear spectroscopy logging a source of energetic neutrons is conveyed downhole as part of a logging tool or logging toolstring and repeatedly caused to emit a radiative neutron burst that irradiates the surrounding rock and borehole. Interactions between the emitted neutrons and elemental nuclei in the rock cause the excitation of the nuclei. When each nucleus de-excites a gamma ray is emitted that is characteristic of the elemental components within the rock. The logging tool is incrementally moved along the borehole as outlined in order to generate spectroscopy data at a variety of logging depths.

The gamma radiation is detected using one or more detectors, forming part of the logging tool or toolstring, including a scintillation crystal and photomultiplier tube that generate electrical signals (spectra) in dependence on the incident gamma energy. Analysis, filtering and/or combining techniques are performed on the electrical signals or further signals representative of them in an attempt to identify the minerals present.

The spectra fall in two categories, namely the "burst spectrum" (sometimes also referred to as the "inelastic spectrum") and the "capture spectrum", these terms being familiar to the person of skill in the art and also being explained in more detail hereinbelow.

The burst spectrum arises immediately after emission of a neutron burst and results from the interaction of highly energetic neutrons with nuclei relatively close to the neutron source. The capture spectrum arises at a later time and results from interactions of less energetic neutrons with nuclei located further from the neutron source.

The known inversion techniques seek to associate energy peaks in the spectra with particular elements. Energy peaks characteristic of the majority of elements likely to be encountered underground arise in either the burst spectrum or in the capture spectrum. However some elements can give rise to energy peaks in both the spectra, leading to ambiguities in the weight fraction data resulting from the inversion processing.

A known nuclear spectroscopy inversion technique is summarized in flow chart form in FIG. 1. Nuclei from elements in the rock (region 106 of FIG. 2 described below) penetrated by a borehole 104 (FIG. 2) interact with the neutrons, and values (based on the characteristic gamma energy emitted by a nucleus as a result and then detected) are each allocated to a respective channel. The resulting sequence of channels gives rise to the burst spectrum signals 10. Elemental standards which are defined separately using modeling and known formations are used in the deconvolution 11 to determine the burst elemental counts 12. The elemental counts can be normalized and then directly related to elemental weight fractions 13.

The capture spectrum 14 is similarly processed but a significant difference between the burst spectrum 10 and the capture spectrum 14 is that the latter includes counts deriving from collisions with hydrogen nuclei and not oxygen nuclei whereas the former includes counts deriving from collisions with oxygen nuclei and not hydrogen nuclei.

In prior art nuclear spectroscopy inversion techniques following deconvolution 16 of the capture spectrum to find the elemental counts 17, any element which is present in the rock as part of the fluid must be discarded as the prior art (oxides closure model 19 described herein) technique is only workable in respect of the dry weight fraction of elements. The result is a set of elemental capture yields 18 that omit information on hydrogen and (based on a separate assessment of the formation 106) are believed not to form part of the rock solids. The capture yields are then normalized and the capture elemental weight fractions are calculated using the oxides closure model 19 and combined with the burst element weight fractions to find the complete elemental concentrations 21.

This model assumes that the dry weights of the minerals sum to unity. Oxide concentrations are calculated from cation concentrations (SiO2 from Si, for example). The concentration of each element is calculated from the elemental sensitivity ($S_i$), its normalized yield ($Y_i$) and a normalization factor (N) of the measurement in the following way $$C_i = N Y_i / S_i$$

where the normalization coefficient N is determined by assuming the sum of the oxides equals one, such that $$\Sigma O_i C_i = 1 = N \Sigma O_i Y_i / S_i$$

where Oi is the oxide extraction factor for each element.

Most of the yields are calculated from the capture spectrum, but some elements are obtained from the burst spectrum. Prior art varies in respect of how the elemental concentrations from capture and burst spectra are combined.

Based on the summing assumption it becomes possible to convert the burst element weight fractions 13 and the normalized capture yields 19 to element concentrations 21.

The element concentrations then can be converted to mineral concentrations 23 through use of a formation model 22, which at its simplest is a list, chosen by a technologist, of the minerals that are likely to be present in the rock under study together with a list of rules governing the partition of elements among the minerals. The resulting mineral concentrations 23 then require conversion back to element concentrations 24 so they can be the subject of an error minimization step 26 in which the calculated element concentrations 24 are compared with the model in a least squares minimization technique. The formation model 22 may then be adjusted and the steps 23, 24, and 26 iterated until a minimum error is reached. The formation model giving rise to the minimum error is then assumed to be that of the rock and output as a mineral weight fraction 28.

The foregoing process is complex, requiring multiple inversions. It is generally not possible unambiguously to calculate mineral concentrations (weight fractions) from elemental concentrations. The situation is further complicated because some minerals (certain clays, for example) may be part of a continuum whose structures allow one element to substitute for another, and therefore differ to relatively subtle degrees. The formation model therefore needs constraints. These may come from independent physical evidence (from core or drill cuttings samples, for example), and/or from the interpretation of additional log data. In the prior art the latter is generally a separate and usually subjective process.

There are different methods which can correct for concentrations of elements that appear in the borehole and formation by adjusting the elemental concentrations/yields/spectra. In one prior art method, an adjustment is made to the capture yield during the normalization step in the workflow. These corrections are derived using Monte Carlo simulation and empirical data techniques.

The prior art methods require separate, independently operated solvers for the burst and capture spectra respectively. As a result elements that could give rise to both burst and capture counts may give rise to two potentially different yields, and two potentially different sets of mineral weight fractions.

Often the reasons for choosing a particular formation model 22 are not recorded; and the choice and subsequent adjustment of the formation model often are somewhat subjective.

The removal of information pertaining to hydrogen means the prior art methods cannot consider formation porosity.

There is a need to address one or more drawbacks of prior art neutron spectroscopy inversion methods.

SUMMARY OF THE DISCLOSURE

According to the disclosure hereof in a first aspect there is provided a method of determining the component weight and/or volume fractions of subterranean rock, comprising the steps of:

a. generating or selecting one or more formation model signal representing a formation model listing minerals present in the rock;

b. using the one or more formation model signal to generate one or more first formation mineral and fluid concentration data set signal;

c. calculating from the one or more first mineral and fluid concentration data set signals one or more first elemental concentration signal representing a first simulated log of elemental concentrations in the rock;

d. forward modeling from the one or more elemental concentration signal one or more simulated energy spectrum signal and one or more simulated constraining log signal;

e. generating one or more spectrum signal, representing one or more spectra, from detection of gamma radiation resulting from operation of a neutron logging tool in a borehole penetrating the rock and generating one or more constraining log signal representing one or more constraining log;

f. comparing the one or more spectrum signal and the one or more first simulated energy spectrum signal, determining the resultant error and generating one or more first error signal indicative thereof;

g. comparing the one or more constraining log signal and the one or more first simulated constraining log signal, determining the resultant error and generating one or more first error signal indicative thereof;

h. using the one or more formation model signal to generate at least one further formation mineral and fluid concentration data set signal;

i. calculating from the further mineral and fluid concentration data set signal a further calculated elemental concentration signal representing a further simulated log of elemental concentrations in the rock;

j. forward modeling from the one or more elemental concentrations one or more further simulated energy spectrum signal and a further simulated one or more constraining log signal representing one or more constraining log;

k. comparing the one or more spectrum signal and the further simulated spectrum signal, determining the resultant error and generating one or more further error signal indicative thereof;

l. comparing the one or more constraining log signal and the further simulated constraining log signal, determining the resultant error and generating one or more further error signal indicative thereof;

m. selecting the formation mineral and fluid concentration data set that results in a minimal error signal respectively between Steps f. and k.; and Steps g. and l.; and n. generating one or more output signal indicating the selected formation mineral and fluid concentration data set.

This method presents several advantages over the prior art.

Primary among these is that the problem of overdetermination, leading to instances of one and the same element influencing both the burst and capture spectra, is entirely avoided through the use of single non-linear solver that simultaneously compares all spectra (i.e. two spectra when both burst and capture spectra are assessed) and the forward modeled fluid and mineral concentration data set as part of an error minimization routine. This approach avoids the separate treatment of the spectra that results in such possible overdetermination in the prior art.

Moreover the method disclosed herein is successfully operable even if only one spectrum (say the capture spectrum) is provided, assuming of course that the formation model does not include elements that could only be detected in the burst spectrum.

The method of the invention is computationally more straightforward than the prior art, and is operable in respect of formation fluids as well as mineral weight and/or volume fractions. Consequently in contrast to the prior art the method may provide indications of formation porosity.

The use of a single solver helps human interpreters identify sources of uncertainty; and moreover logs exhibiting the largest reconstruction errors provide insights into areas of uncertainty that are superior to those deriving from the use of separate solvers in the prior art.

Prior art methods use a two-stage process to compute elements-from-spectra, then minerals from elements. If the minerals result is not consistent with other information, the human interpreter must decide whether to address the inconsistency in one or both stages, and may spend substantial amounts of time adjusting parameters in the first stage to achieve the desired degree of geological self-consistency. The disclosed method, on the other hand, is a single stage process which reduces the need for human interaction, particularly when the formation model is known. This makes the overall process faster. It is also amenable to automation, making the results less subjective and more reproducible than in the prior art.

The disclosed method voids the need to ensure that oxides in a spectra-to-elements calculation match the oxides present in the minerals (which may not be known at the time the elements are determined).

It is known that elemental sensitivities have a second order dependence on porosity and on the other minerals present in the rock. Accounting for this is problematic in the two-stage prior art methods, but is straightforward in the method of the disclosure.

Furthermore the method disclosed herein uses all the elements in the minerals list (for which an elemental standard is defined) to match to the combined burst and capture spectra. This is superior to some prior art methods which use two sub-sets of elements to match the burst and capture spectra individually, and can give rise to two different elemental concentrations for the same element.

A preferred technique for obtaining one or more energy spectrum signal from one or more elemental concentration signal is explained in FIG. 8 described below.

Preferably the one or more formation model signal generated or selected in Step a. includes information on one or more fluids and minerals assumed to be present in the rock. This illustrates that the method can take account of collisions with hydrogen nuclei. As a result the method may determine formation fluid weight fractions and as stated may provide log signals indicating the porosity of a formation.

Further preferably the method includes the step of operating one or more logging tool preferably in the borehole in order to generate the one or more constraining log signal. The one or more constraining log signal may include one or more selected from the list comprising formation log density signals, apparent neutron porosity signals, photoelectric absorption factor (Pe) signals, formation Sigma signals, natural radiation signals indicative of radiation occurring naturally in the rock; resistivity signals, spectral gamma ray signals, acoustic slowness signals, rock physics model signals modeling rock acoustic behavior, core data signals and cuttings data signals. The one or more logging tool operated to generate the one or more constraining log signals may be configured according to the precise constraining log signal requirement, as would occur to the person of skill in the art. As implied by the foregoing list of possible constraining log signals in some cases the constraining log signals are not generated by a logging tool in a borehole and instead are generated by equipment in e.g. a surface-located laboratory. The term "logging tool" in this context as necessary includes such equipment.

Optionally the method may include the step of generating one or more neutron slowing down signal and one or more diffusion length signal and deriving the mentioned one or more apparent neutron porosity signal therefrom. This represents a per se known way of generating apparent neutron porosity log signals.

In an optional refinement the method includes the step of deriving from the one or more spectral gamma ray signal one or more signal indicative of the presence of Potassium, Uranium and/or Thorium in the rock. Such signals may be used in the method as additional or alternative constraining signals. As is known in the nuclear logging art an assessment of the fraction of the indicated elements can indicate the presence or absence of clays. This is useful information to log analysts and geologists.

Although it is possible to perform the method in respect of a single capture signal, preferably the one or more spectrum signal includes one or more of a burst spectrum signal and a capture spectrum signal. The choice of whether to use one or both spectra will depend on the formation model.

Further in this regard optionally the method includes the step of causing a neutron logging tool in a borehole penetrating the rock to emit one or more neutron burst, wherein the burst spectrum signal derives from detection of gamma radiation in a first time period after the beginning of a said burst; and, preferably, the capture spectrum signal derives from gamma radiation detected in a second time period after a said burst.

Thus the method may make use of known characteristics of neutron logging apparatuses.

Preferably the method includes the step of moving a neutron logging tool to a plurality of logging depths along a borehole penetrating the rock, and repeating at least Steps a. to l. in respect of a plurality of the logging depths. Logging at discrete depths is known per se in the logging art. Typically the logging activity would take place when the logging tool is stationary in the borehole, with movement of the logging tool to a series of new depths occurring between logging operations.

In embodiments the method includes the step of o. generating a wellbore log comprising or derived from a plurality of output signals generated at Step n. in respect of the plurality of logging depths. In this regard it is commonplace to log the entire length of a borehole, or at least the length that extends through a formation of interest.

Preferably at least Steps a., b., c., d., e., g., h., i., j. and k. of the method are carried out using a processing, typically programmable, device. Such a device may be e.g. a surface-located computer to which the logging apparatus used in the method is connected e.g. using wireline, the nature of which is known to the person of skill in the art. Alternatively the programmable device may be e.g. a processor forming part of the logging tool or constituted as a sub forming part of a tool string, the term "sub" being understood in the downhole tool art. Other possibilities for providing a programmable device are viable and would be apparent to the person of skill in the art.

The disclosure additionally extends to apparatus for determining the component weight fractions of subterranean rock, comprising a first logging tool, logging tool sub or logging tool assembly including (i) a neutron source that is capable of effecting plural radiative neutron bursts; and (ii) one or more detector of gamma radiation, whereby the logging tool or logging tool assembly is capable of generating one or more spectrum signal, representing one or more spectra, from detection of gamma radiation following emission of a neutron burst; the apparatus including or being operatively connected to a processing device that is capable of completing processing steps of:

a. generating or selecting one or more formation model signal representing a formation model listing minerals present in the rock;
b. using the one or more formation model signal to generate one or more first formation mineral and fluid concentration data set signal;
c. calculating from the one or more first mineral and fluid concentration data set signal one or more first elemental concentration signal representing a first simulated log of elemental concentrations in the rock;
d. forward modeling from the one or more elemental concentration signal one or more simulated energy spectrum signal and one or more simulated constraining log signal;
e. generating one or more spectrum signal, representing one or more spectra, from detection of gamma radiation resulting from operation of a neutron logging tool in a borehole penetrating the rock and generating one or more constraining log signal representing one or more constraining log;
f. comparing the one or more spectrum signal and the one or more first simulated energy spectrum signal, determining the resultant error and generating one or more first error signal indicative thereof;
g. comparing the one or more constraining log signal and the one or more first simulated constraining log signal, determining the resultant error and generating one or more first error signal indicative thereof;
h. using the one or more formation model signal to generate at least one further formation mineral and fluid concentration data set signal;
i. calculating from the further mineral and fluid concentration data set signal a further calculated elemental concentration signal representing a further simulated log of elemental concentrations in the rock;
j. forward modeling from the one or more elemental concentrations one or more further simulated energy spectrum signal and a further simulated one or more constraining log signal representing one or more constraining log;
k. comparing the one or more spectrum signal and the further simulated spectrum signal, determining the resultant error and generating one or more further error signal indicative thereof;
l. comparing the one or more constraining log signal and the further simulated constraining log signals, determining the resultant error and generating one or more further error signals indicative thereof; and
m. selecting the formation mineral and fluid concentration data set that results in a minimal error signal respectively between Steps f. and k. and Steps g. and l.

In embodiments the processing device preferably is a programmable device such as a surface-located computer.

Optionally the apparatus may include one or more sources of at least one constraining log signal representing one or more constraining log, wherein the processing device additionally uses the at least one constraining log signal to generate one or more first formation mineral and fluid concentration data set signal. Such sources may be constituted as or may include one or more further logging tool, logging tool sub or logging tool assembly that is capable of generating the at least one constraining log signal. The further logging tool, logging tool sub or logging tool assembly may be connected to or part of the first logging tool, logging tool sub or logging tool assembly, or it may be separate from it.

Conveniently the further logging tool, logging tool sub or logging tool assembly is capable of generating one or more selected from the list comprising formation log density signals, apparent neutron porosity signals, photoelectric absorption factor (Pe) signals, formation Sigma signals, natural radiation signals indicative of radiation occurring naturally in the rock; resistivity signals, spectral gamma ray signals, acoustic slowness signals, rock physics model signals modeling rock acoustic behavior, core data signals and cuttings data signals. The core/cuttings signals may be generated e.g. in the borehole (using the logging tool or another device connected thereto), a test rig or a laboratory.

The apparatus may include a non-transitory computer medium having program instructions stored thereon to cause the programmable device to complete one or more of the processing steps. Such medium may be permanently or temporarily part of the apparatus and may take the form of e.g. a computer disk, flash memory or similar device and may be of a range of types including but not limited to RAM, SRAM or DRAM.

The apparatus optionally may include wireline operatively connecting the first logging tool or logging tool assembly to the one or more programmable device. Such an arrangement typically would exist when part or all of the programmable device is at a surface location or is otherwise remote from the remainder of the apparatus.

In embodiments the apparatus may include or be operatively connected to one or more of a plotter, printer, display or memory. Such devices permit the generation of visual analogues of the signals constituting the selected weight or volume fractions, or the storing of data indicative thereof.

The disclosure further relates to a borehole-apparatus system including a borehole penetrating subterranean rock and having moveably inserted therein at least the first logging tool or logging tool assembly constituting or forming part of apparatus according to the present disclosure. Optionally such a system may include moveably inserted therein the further logging tool or logging tool assembly constituting of forming part of apparatus according to the present disclosure.

BRIEF DESCRIPTION OF THE DRAWINGS

There now follows a description of preferred embodiments of the invention, by way of non-limiting example, with reference being made to the accompanying drawings in which.

DETAILED DESCRIPTION

Figure 2:
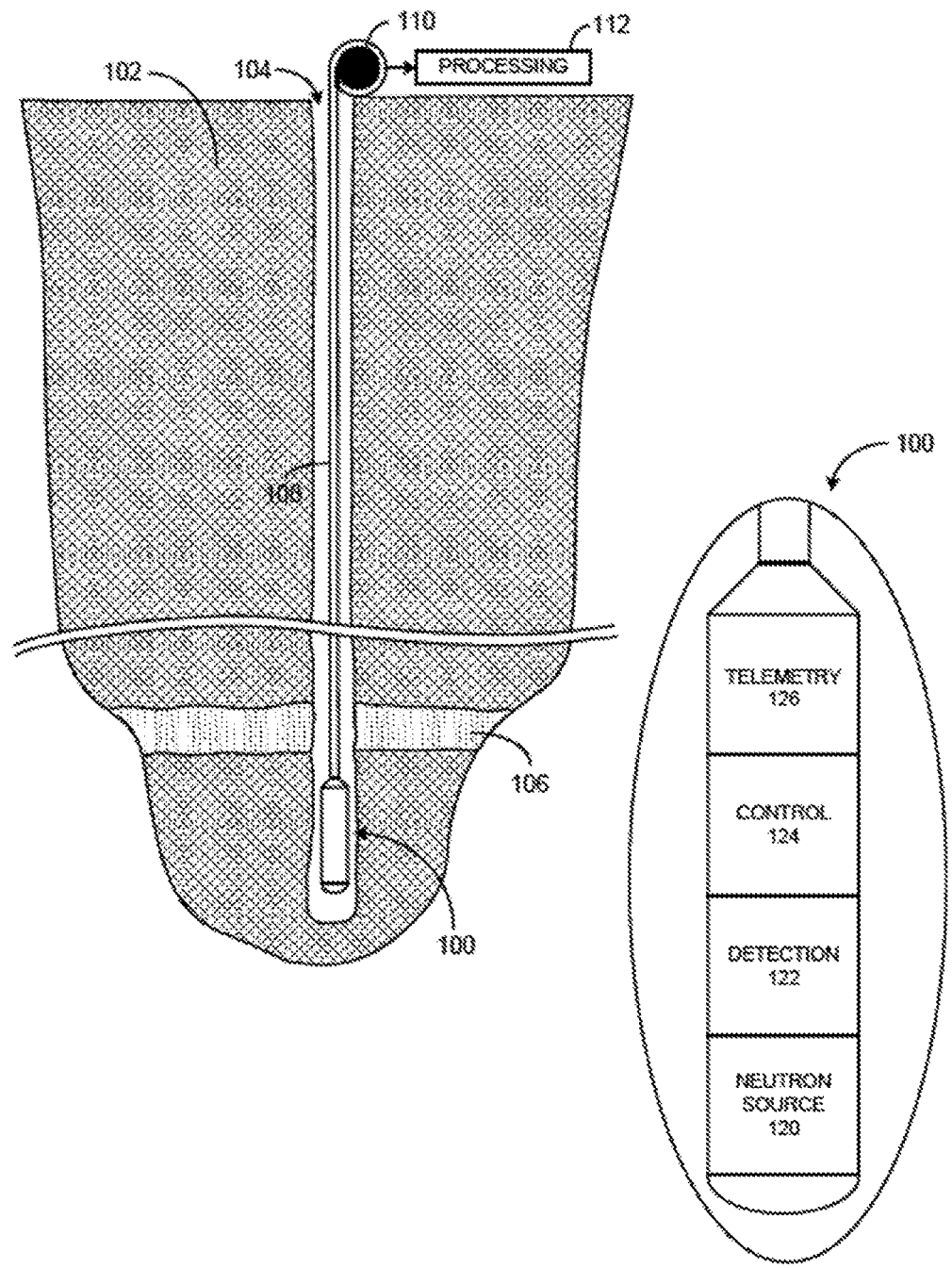
FIG. 2 shows an overview of the various components associated with the deployment of a neutron logging tool in a wellbore in accordance with an embodiment of the disclosure.

FIG. 2 illustrates a neutron logging tool 100 used for obtaining induced gamma radiation measurements relating to the geological formation 102 adjacent to a wellbore (borehole) 104. Such measurements provide valuable information regarding natural resources that may be located at various depths along the wellbore 104. For example, measurements that are recorded when the tool 100 is adjacent to the region 106 may indicate that it is likely to contain desirable natural resources. In the illustrated embodiment, the tool 100 is conveyed within the wellbore 104 by a wireline logging cable 108 that is connected to draw works 110 and a processing system 112 at the surface. The wireline logging cable 108 supports the weight of the tool 100 and acts as a data conduit between the processing system 112 and the tool 100. While the tool 100 is illustrated as being conveyed via wireline 108, it will be understood that the tool 100 could also be conveyed into the wellbore 104 in other ways such as via coiled tubing, drill string (e.g., during a logging while drilling operation), etc.

The tool 100 includes a neutron source section 120, a detection section 122, a control section 124 and a telemetry section 126. The neutron source section 120 includes a neutron source 130 that bombards the formation adjacent the tool 100 with high energy neutrons (e.g., 14 MeV). The neutron source 130 preferably is a pulsed neutron generator, which enables the precisely timed emission of neutrons, but it may also be a chemical neutron source such as an Americium-Beryllium source. The detection section 122 includes one or more detectors that detect gamma radiation that is emitted as a result of interactions between emitted neutrons and the nuclei of formation elements. Control section 124 includes control circuitry that controls the operation of the neutron source section 120, detection section 122, and telemetry section 126. The telemetry section 126 includes modulation and demodulation circuitry for sending and receiving electrical signals to and from a remote device such as the processing system 112 (e.g., via wireline 108).

Figure 3:
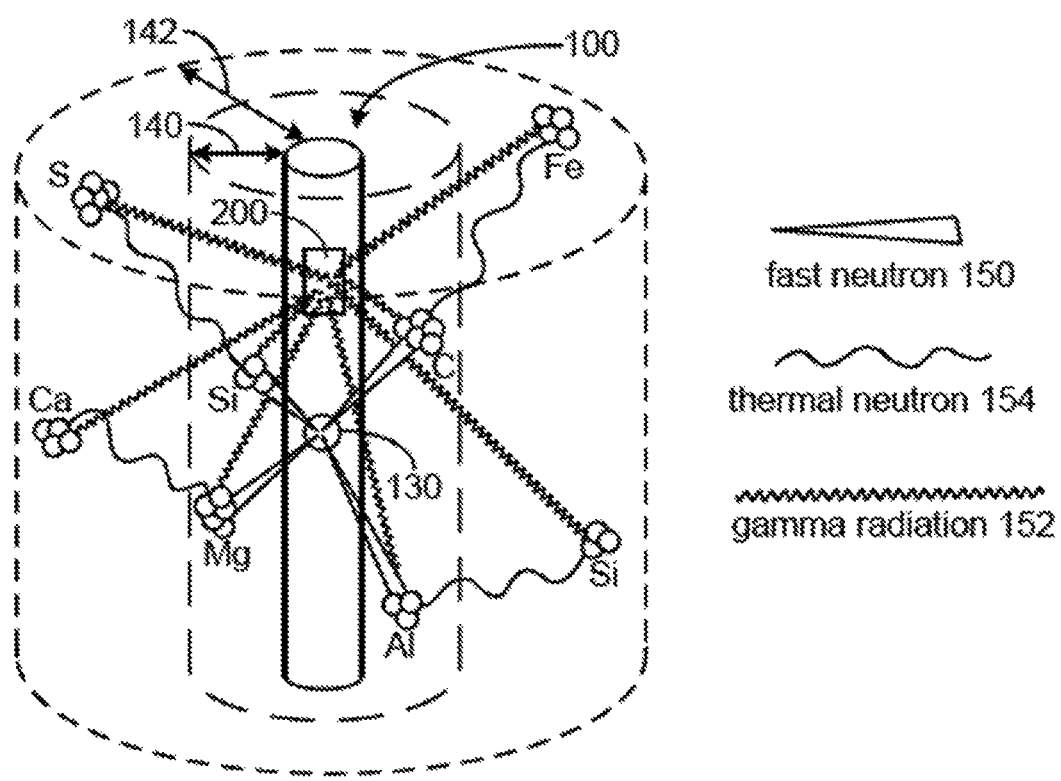
FIG. 3 shows different types of interactions between neutrons emitted by the neutron logging tool and the nuclei of neighboring elements that are detectable by the tool in accordance with an embodiment of the disclosure.

FIG. 3 provides a simplified view of the interactions between neutrons emitted by the tool 100 and the nuclei of neighboring atoms in the formation. Nearer to the neutron source 130 (e.g., within the radius 140), fast-moving neutrons 150 are scattered through inelastic and elastic collisions with the nuclei of atoms in the formation. When inelastic scattering occurs, a portion of the kinetic energy of the neutron is transferred to the nucleus of the atom with which it collides, decreasing the energy of the neutron. Often, at least a portion of the energy transferred from the incident neutron to the atom's nucleus briefly activates the nucleus to an unstable, excited state. When the nucleus transitions back to a stable, ground state, it may emit gamma radiation 152 with energy that is characteristic of the atom. As the neutrons move away from the neutron source 130 (e.g., outside of the radius 140 and within the radius 142) and continue to lose energy, they reach thermal equilibrium with the surrounding medium. These "thermal neutrons" 154 will eventually be absorbed by the nuclei of neighboring atoms, resulting in new isotopes of the atoms. The absorption of a thermal neutron often results in the emission of gamma radiation 152 with energy that is again characteristic of the atom that absorbed the neutron. The different elements that interact with neutrons in the ways shown in FIG. 3 are described as "detection elements" because the gamma radiation that they produce is detectable and can be attributed to the type of element that resulted in the gamma radiation as described below.

Gamma radiation refers generally to high-energy electromagnetic radiation having an energy level that exceeds 100,000 electron Volts (100 keV). Gamma radiation 152 that is emitted as a result of the above-described neutron interactions (as well as naturally-occurring gamma radiation) generally has an energy between 100 keV and 10 MeV and is detected by one or more gamma radiation detectors 200 in the detection section 122 of tool 100. Each detector 200 may be placed near the periphery of the tool 100 to minimize the distance between the detector 200 and the gamma radiation source, i.e., the formation 102 traversed by the wellbore 104.

Figure 4:
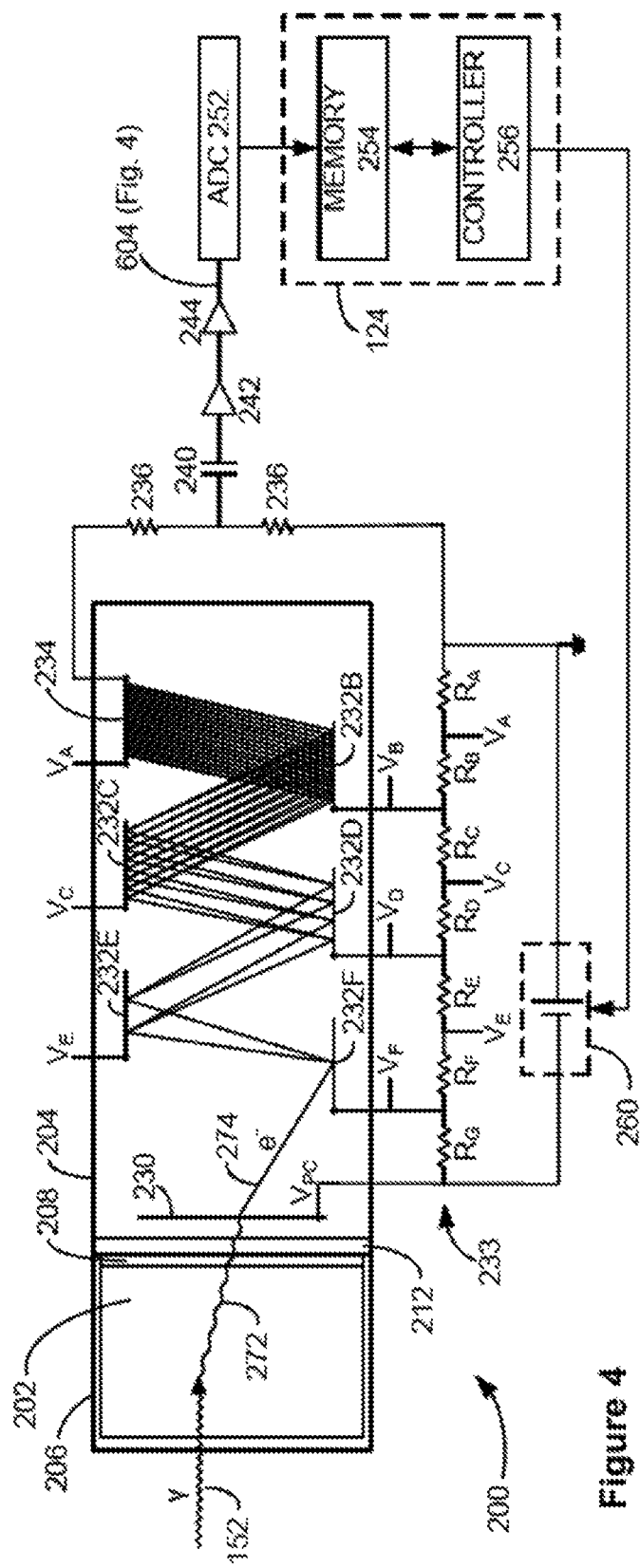
FIG. 4 shows various components of a gamma radiation detector in the neutron logging tool in accordance with an embodiment of the disclosure.

FIG. 4 shows an example detector 200 that includes a scintillation crystal 202 and a light sensor 204 (i.e., a photomultiplier tube (PMT)). The scintillation crystal 202 may be formed from materials that exhibit desirable scintillation properties upon interaction with gamma radiation such as lanthanum bromide (LaBr3), sodium iodide doped with thallium (NaI(TI)), cesium iodide doped with thallium or sodium (CsI(TI) or CsI(Na)), bismuth germanate (BGO), or other organic or inorganic materials. An incoming gamma radiation photon 152 traverses the crystal 202's light-reflective housing 206 (which is only reflective to lower-energy photons) and interacts with the scintillation crystal 202, which causes the emission of a larger number of lower-energy photons 272 (e.g., ultraviolet or visible light) as excited atoms in the crystal 202 return to the ground state. The lower-energy photons 272 have an energy content that is generally proportional to the energy of the gamma radiation photon 152.

Because the crystal 202 is surrounded by the light-reflective housing 206, the resulting photons 272 can only escape the crystal 202 through the transparent cover 208, which is optically coupled to the PMT 204. The PMT 204 is an evacuated tube containing a photocathode 230, several dynodes 232, and an anode 234 within a glass housing. The photocathode 230 is held at a high negative voltage VPC that is supplied from a power supply 260, and the anode 234 is held at voltage VA which may be near a ground potential. The dynodes 232 form a voltage gradient between VPC and VA with each of the dynodes 232 being held at a higher potential than the node preceding it (i.e., VPC<VF<VE . . . <VB<VA). The voltage differential between VPC and VA may be on the order of 900 to 1100 Volts. The distributed voltages are created by a voltage divider circuit 233 including a number of resistors, which may be of equal value. It should be noted that the actual PMT 204 might include more dynodes 232 than shown in FIG. 3. Although not illustrated, electronic circuitry 250 may include one or more capacitors across the dynodes 232 to help stabilize their voltages as electrons propagate through the PMT 204.

As the photons 272 exit the crystal 202 through the cover 208, they strike the photocathode 230, which is a conductive, photosensitive coating that is applied to the surface of the PMT adjacent to the cover 208. Upon the arrival of the photons 272, a small group of primary electrons 274 is ejected from the surface of the photocathode 230 as a consequence of the photoelectric effect. The primary electrons 274 leave the photocathode 230 with an energy equal to the incoming photons 272 less the work function of the photocathode 230. Due to the geometric arrangement of the dynodes 232 and the manner in which they are biased, the primary electrons 274 are accelerated toward the first dynode 232F, increasing their kinetic energy. Upon striking the dynode 232F, the increased-energy primary electrons 274 cause the emission of a greater number of lower-energy secondary electrons, which are in turn accelerated toward the next dynode 232E. This process continues and results in an exponential increase in the number of electrons that arrive at the anode 234.

The large number of electrons arriving at the anode 234 produces an electrical pulse, which is measured by circuitry in the detector 200. Voltage-divider resistors 236 are sized to decrease the voltage at the anode 234 containing the pulse. A DC-blocking capacitor 240 removes the DC component of this decreased voltage signal, such that only the AC portion of the voltage signal caused by the pulse (and ultimately by the gamma radiation photon 152) is passed for further processing. This AC voltage signal is preferably pre-processed by a preamplifier 242 and further amplified by an amplifier 244. The amplifier 244 may further shape the electrical signal, for example by generating a biphasic pulse with a shortened decay time.

Figure 5:
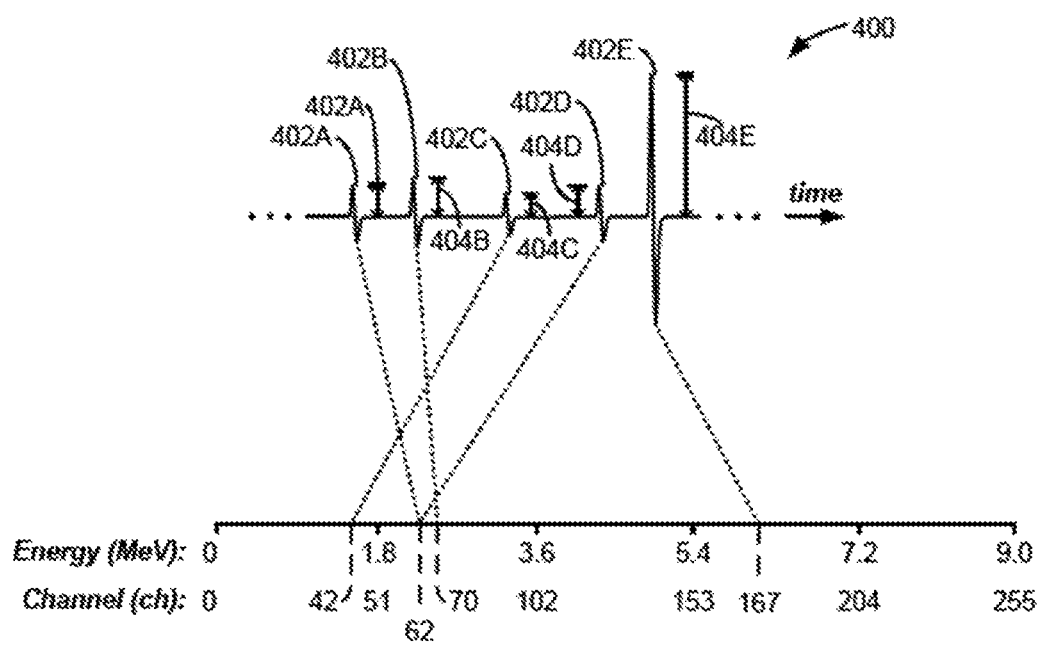
FIG. 5 shows a sequence of electrical pulses that correspond to the detection of various gamma radiation photons by the gamma radiation detector in accordance with an embodiment of the disclosure.

FIG. 5 illustrates a stream of pulses 400 generated by the amplifier 244 in response to the detection of various gamma radiation photons 152 by the detector 200. As a result of the detection physics involved, the magnitude 404 of each pulse 402 is proportional to the energy of its associated gamma radiation photon 152.

Figure 6:
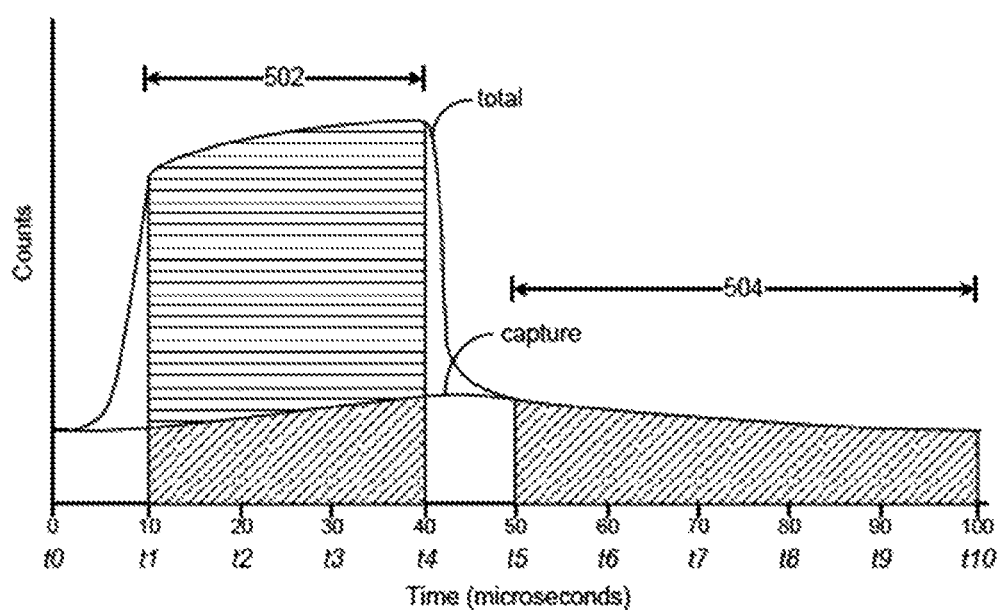
FIG. 6 shows an example of the number of gamma radiation photons that are detected during a neutron pulse cycle in accordance with an embodiment of the disclosure.

FIG. 6 shows an example of the total number ("counts") of detected gamma radiation photons 152 (of various different energy levels) that are observed during the course of a single neutron pulse cycle as well as the number of those total photons that are emitted as a result of a neutron capture interaction. In the illustrated example, the neutron source 130 is pulsed at 10 kHz, so each detection cycle lasts 100 microseconds. When the neutron source 130 pulse begins at t0, the one or more detectors 200 of the tool 100 continue to observe gamma radiation photons that are emitted as a result of neutron capture interactions associated with neutrons that were emitted during the previous neutron pulse.

Between t0 and t1, gamma radiation detected by the detectors 200 sharply increases, primarily as a result of inelastic collisions between the emitted neutrons and the nuclei of formation atoms. The one or more detectors 200 are synchronized with the source 130, and between times t1 and t4 (interval 502), the pulses 402 are digitized by an Analog-to-Digital converter (ADC) 252 (FIG. 4), and the digitized pulses, or at least their magnitudes 404, are stored in a memory 254. The digitized magnitudes 404 enable each gamma radiation photon observed by the detector 200 to be sorted into a channel based on the photon's energy. In the example shown in FIG. 5, the full 0-9 MeV detection energy range is divided into 256 channels each having an energy range of approximately 35 keV although other numbers of channels (e.g., 1024) with different energy resolutions may also be used.

Between t4 and t5, gamma radiation sharply declines as inelastic collisions decrease to near zero (i.e., as emitted neutrons lose the energy required for inelastic interactions or move to a distance from the detectors 200 at which such interactions are not easily detectable) and, during this time period, no pulses 402 are stored in the memory 254. Between t5 and t10 (interval 504), the observed gamma radiation is caused almost exclusively by neutron capture interactions, and the magnitudes 404 of digitized pulses are again stored in the memory 254.

The digitized magnitudes 404 for the pulses 402 detected within the intervals 502 and 504 are provided from memory 254 to a controller 256 (e.g., a microprocessor, a microcontroller, a FPGA, or other logic circuitry). From the data corresponding to the intervals 502 and 504, the controller 256 generates a raw total spectrum and a raw capture spectrum, respectively. Although a single neutron pulse cycle is illustrated in FIG. 5, the data utilized to generate the raw spectra is typically collected across multiple neutron pulse cycles. The number of cycles included in the spectra is dependent upon the rate at which the tool 100 is conveyed through the wellbore 104 and the desired spectral resolution increment (i.e., the depth interval over which a spectrum will be generated).

Essentially, the raw total spectrum comprises a histogram in which each pulse 402 recorded within the interval 502 increments a count of a particular channel based on its magnitude 404. Similarly, the raw capture spectrum is essentially a histogram based on the pulses within the interval 504. Each spectrum specifies a quantity of the detected gamma radiation that is within each of a plurality of energy ranges. Although not illustrated, some portion of the gamma radiation detected by the tool 100 may result from background (i.e., naturally-occurring) radiation and/or interactions of emitted neutrons with atoms in a borehole fluid or wellbore conduit (e.g. casing). The raw total and capture spectra are processed by the controller 256 to remove these effects.

The apparatus visible in FIG. 2 may be connected, typically by way of a data (e.g. wireline) cable, to a processing device. Typically this would be located at the surface location near the draw works 110 and would be constituted as a programmable device such as a computer. In the illustrated embodiment such a computer forms part of the processing equipment 112, although other arrangements and locations of the programmable device are possible. As a non-limiting example in this regard some or all of the desired processing capability may be provided in the form of a programmable device supported by and/or forming part of the logging tool 100.

In a further optional arrangement the logging tool 100 may be of the kind, mentioned above, having a power source and one or more on-board memory device. Such a logging tool 100 records log data signals using the memory device(s) during logging operations. When logging operations are finished the logging tool is retrieved to a surface location where it is connected to e.g. a computer. The stored log data are downloaded as signals to the computer that then processes the signals in accordance with the method described herein.

The logging tool 100 is illustrated schematically and may in practice take the form of e.g. a series of subs that are connected one to another to form a logging tool assembly. The one or more further logging tool, logging tool sub or logging tool assembly may be constituted as part of the illustrated logging tool 100 or may be separate therefrom.

Figure 1:
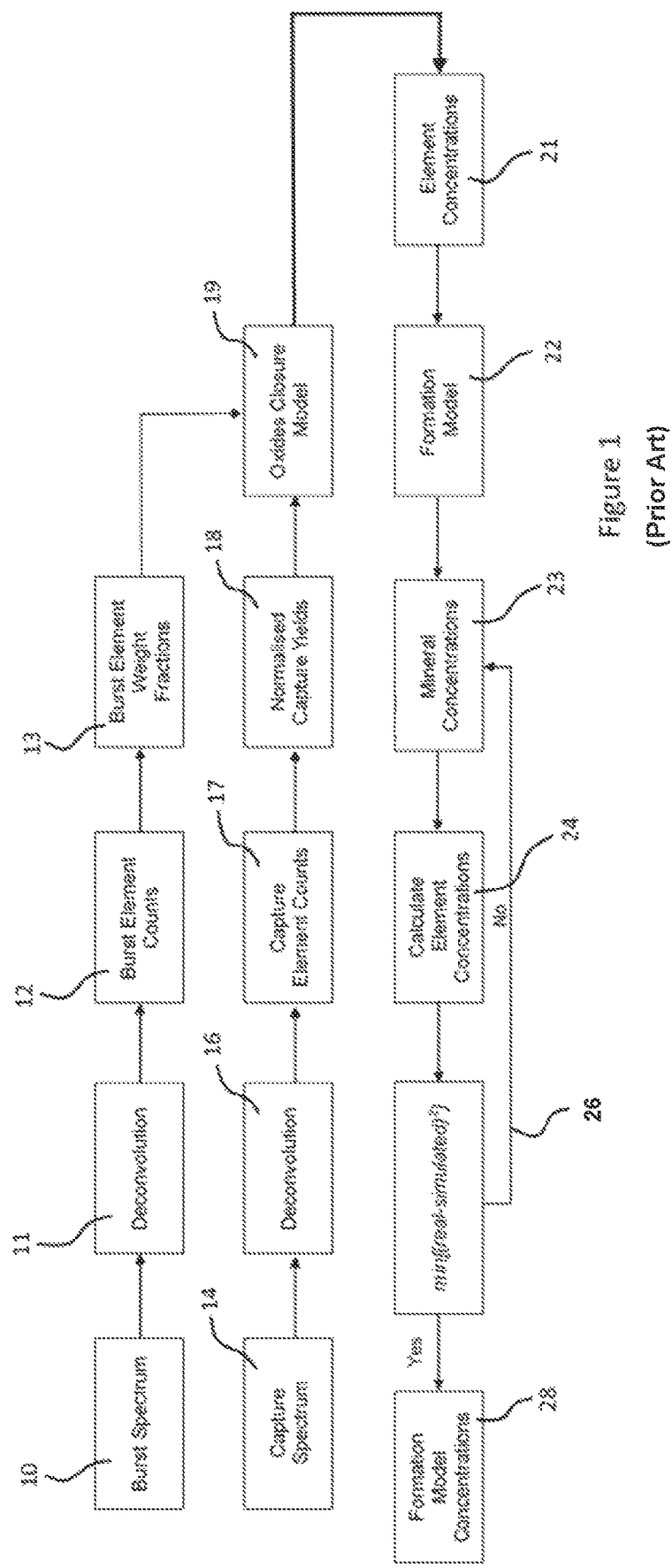
FIG. 1 is a process flow chart summarizing a prior art method of deriving mineral weight fractions.
Figure 7:
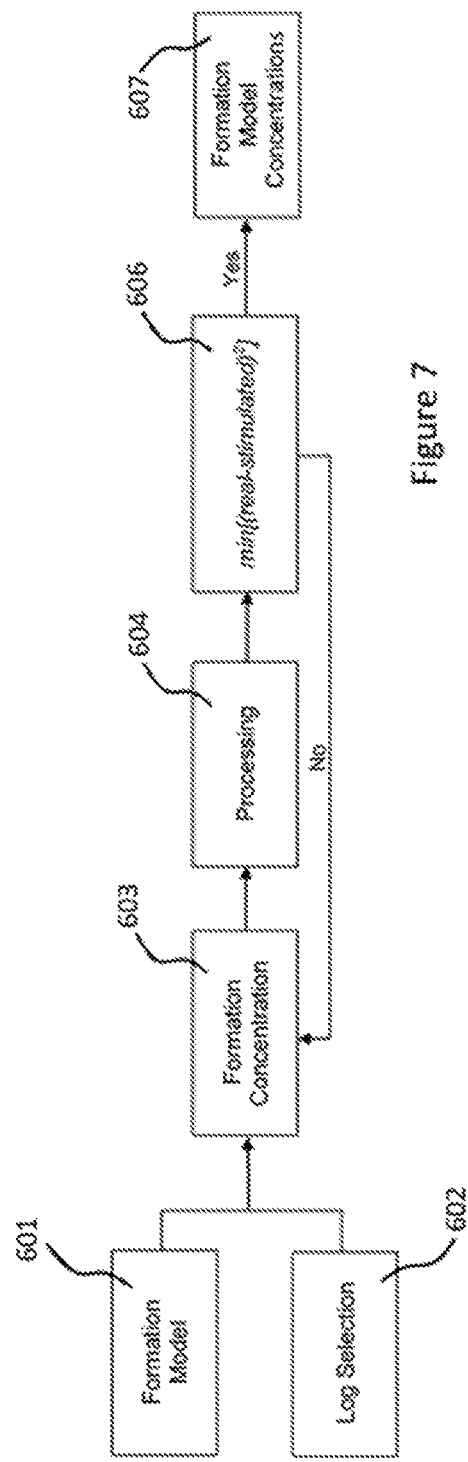
FIG. 7 is an overview process flow chart summarizing in overview an iteratively repeated method, in accordance with the disclosure, of deriving mineral weight fractions and additional beneficial information.

The method carried out by such a tool and programmable device combination is summarized in FIG. 7, which is a process flow chart of a similar kind to FIG. 1. The tool contemplated in the method may be as illustrated in FIGS. 2, 3 and 4, or may differ therefrom in various respects.

In FIG. 7 the spectrum signals output by the detector 200 are processed in accordance with the method hereof with the aim of finding the combination of mineral and fluid weight fractions that is best able to reconstruct the observed spectra as well as other log data acquired in the same well. In doing so it minimizes the differences between observed data and data reconstructed from forward models of the log responses. In the broad manner of its operation it works in the opposite direction to prior art methods, in that it starts with a formation model, i.e. one or more signals indicative of such a model, and finds the mineral and fluid concentrations that cause the best match between the consequential log predictions and the observed logs, noting that in one embodiment multiple formation models may be processed simultaneously.

In addition to burst and capture spectra, one or all of the following log data are used in the process:
1. Formation log density
2. Apparent neutron porosity
3. Photoelectric absorption factor, also known as Pe or PEF
4. Formation Sigma, also known as the macroscopic thermal neutron cross section
5. Potassium (K), uranium (U) and thorium (Th) from a spectral gamma ray log Other logs are known to be sensitive to rock type (indicative of mineralogy), and the method can be configured to include them if available. Gamma Ray and acoustic slowness logs are well-known examples. The construction and use of rock physics models to predict the acoustic behavior of rocks is well known, and such models may also be used as optional constraints. Additional constraints including but not limited to data from cores and/or cuttings may be optionally included, but are not necessary for the functioning of the method. As noted the cuttings and core sample data signals may be generated e.g. using the logging tool 100 in the borehole 104; in a laboratory to which cuttings and core samples are conveyed for analysis; and/or using one or more reference samples such as may be employed in a calibration rig.

The method involves inserting a logging tool such as tool 100 (or as mentioned an acoustic logging tool or a Gamma tool) into a borehole such as borehole 104, and periodically stimulating neutron bursts as described in order to generate spectrum signals as described above or, in the case of a logging tool other than a neutron logging tool 100, otherwise causing the generation of log signals. The method hereof of processing such signals involves firstly generating 601 one or more formation model signal representing a formation model listing mineral present in the rock under examination. This step may involve human intervention in the form of an assessment of the minerals most likely to be present in the rock, or may be the result of an automated selection procedure completed as e.g. a computer sub-routine. The generation or selection 601 of the one or more formation model signals may be based for example on separate log data produced in respect of the rock in question. Such log data may be obtained through the operation of one or more logging tools (that typically would be additional to logging tool 100) in a manner generating signals indicative of the minerals likely to be present.

The step 601 of generating or selecting the one or more formation model signals may involve the selection of a formation model from e.g. a database, and the generation of signals (such as electrical signals) representing the selected model.

The method also includes the generation or selection 602 of one or more constraining log signal preferably selected from the list comprising formation log density signals, apparent neutron porosity signals, photoelectric absorption factor (Pe) signals, formation Sigma signals, natural radiation signals indicative of radiation occurring naturally in the rock; resistivity signals, spectral gamma ray signals, acoustic slowness signals, rock physics model signals modeling rock acoustic behavior, core data signals and cuttings data signals.

Such constraining log signals may be generated through use of a further logging tool, logging tool sub or logging tool assembly as explained herein; or (in the case of core and cuttings-based constraining log signals, the laboratory or calibration rig methods mentioned). The further logging tool, logging tool sub or logging tool assembly may be of any of several types, depending on the kind of constraining log signal appropriate to the rock 102 under examination.

The example constraining log signal types listed herein are non-limiting. In general it is a straightforward matter to select and operate appropriate logging tool equipment for the purpose of generating the constraining log signals. Optionally the constraining log signal generation step may also or alternatively include generating one or more neutron slowing down signal and one or more diffusion length signal and deriving the one or more apparent neutron porosity signal therefrom.

The inversion process begins with initial (first) estimates of the mineral concentration and (when present) fluid concentration and the generation of signals 603 indicative thereof. Such signals represent a first iterative assessment of the minerals and fluids making up the rock in the form of e.g. a mineral and fluid weight and/or volume fraction list, matrix or array. The method proceeds to process this in a manner comparing 606 signals representing the burst and capture spectrums with simulated (forward modeled) burst and capture spectra while also comparing the one or more constraining log with one or more simulated constraining log calculated from the mineral and fluid model.

This stage involves calculating from the one or more first mineral and fluid concentration data set signal one or more first elemental concentration signal representing a first simulated log of elemental concentrations in the rock; and forward modeling from the one or more elemental concentration signal one or more simulated energy spectrum signal.

The comparison steps 606 result in an error signal the value of which may be minimized by iteratively (i.e. at least once) adjusting the formation concentration values as represented by the signals generated at Step 603 and repeating the simulation-comparison steps described herein. The iteration is represented schematically by the feedback loop in FIG. 7, and repetition of the Steps 603, 604, 606 using the adjusted formation concentration values.

The method then involves selecting the formation concentration data set that results in minimal errors in (a) the simulated and actual spectrum signals and (b) the simulated and actual constraining log signals, and presenting this as the mineral weight or volume fraction data set of the rock.

The processing of the spectrum signals and the simulated mineral and fluid model is summarized as Step 604 of FIG. 7, with the comparison taking place at Step 606 and the mineral and fluid model selection step being represented by Step 607. Such steps involve using the processing device (typically a programmable device) 112 to which the logging tool 100 and at least one further logging tool are operatively connected to process the various signals as set down below.

Figure 8:
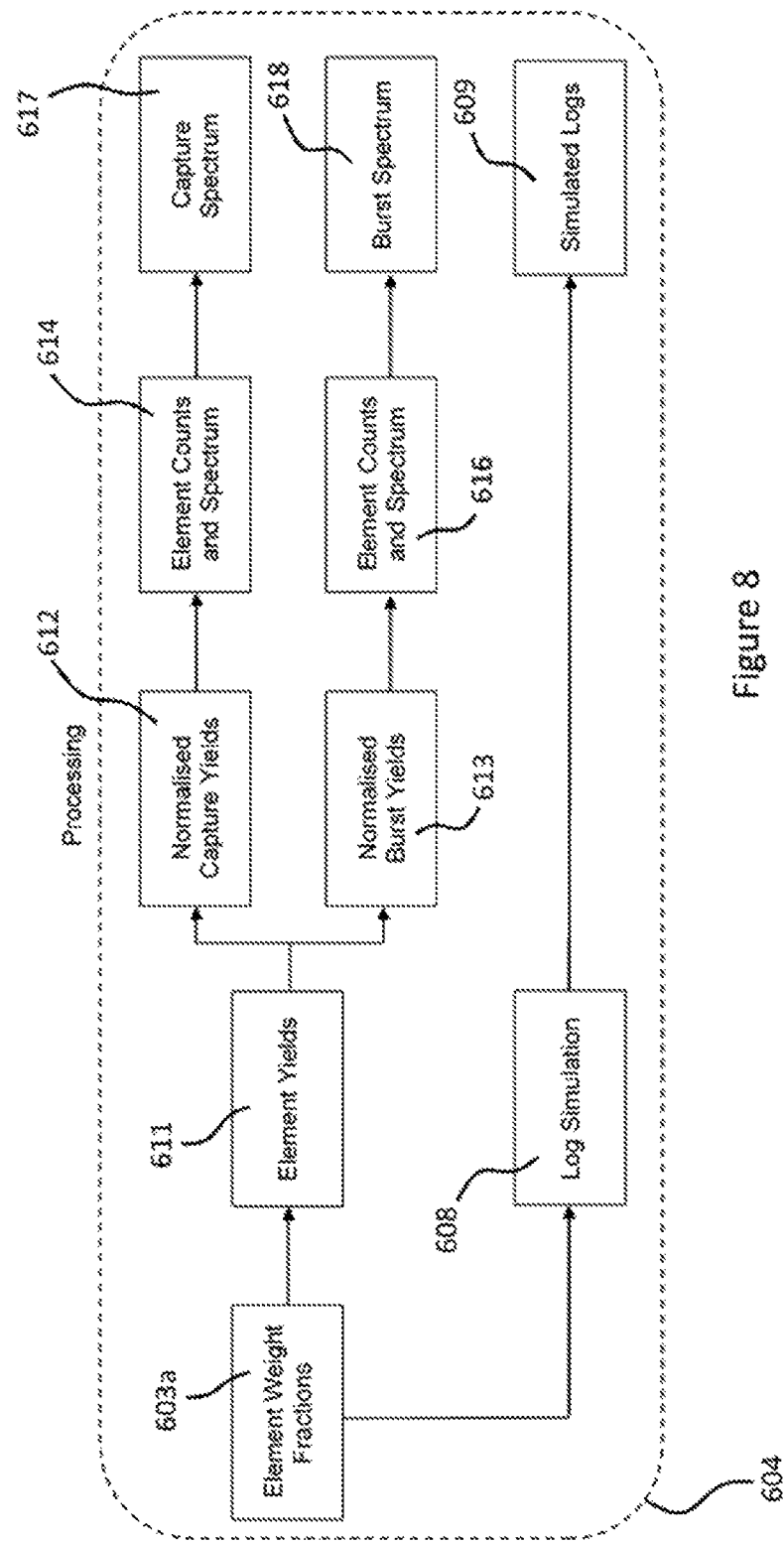
FIG. 8 is a process flowchart showing part of the FIG. 7 process in more detail.

From the mineral and fluid concentrations the elemental concentrations are calculated. FIG. 8 shows how to simulate the energy spectra from the elemental concentrations. FIG. 8 omits the "elemental standards" (the energy spectra of individual elements) which are defined via modeling or known formations, but these may readily be envisaged. The simulated spectrums are then compared to the real spectrums generated through operation of the logging tool 100 and detection apparatus 200 described above.

The elemental yields 611 are calculated from the elemental weight fractions 603a which in turn have been calculated from the initially selected mineral and fluid concentration data set signal 603 representing one or more spectra, derived from detection of gamma radiation resulting from operation of a neutron logging tool in a borehole penetrating the rock and one or more constraining logs.

The elemental yields are then processed with two different methods to produce normalized capture and burst yield signals 612, 613 that in turn are converted to count values 614, 616. Using the elemental count rates and the elemental standards the capture spectrum and burst spectrum signals 617, 618 can be computed.

The step 606 of comparing the one or more signals and the one or more first simulated signals, determining the resultant error and generating one or more first error signal indicative thereof is carried out with respect to the capture spectrum signal 617, the burst spectrum signal 618 and the log signal(s) 609 simulated from the elemental weight fractions 603a as represented by numeral 608.

The comparison step 606 minimizes the squared difference between the spectrum signals 617, 618 and the simulated spectrum; and the squared difference between the one or more log signals mentioned above and the simulated one or more log signals 609. Iteration of the process of FIG. 7 occurs, with modification of the formation concentrations model 603, until a minimal error results. The formation concentration model 603 giving rise to this then is output as the formation concentrations model 617.

In practice the foregoing method steps would be repeated for a large number of logging depths measured along the borehole 104.

As noted optionally the method may include the step of obtaining one or more signals indicative of the presence of Potassium, Uranium and/or Thorium in the rock. As is well-known such data are useful in determining the presence of numerous rock types, and they can remove ambiguities from spectral gamma outputs. Typically the Potassium, Thorium and Uranium count signals are obtained by way of a spectral gamma log that measures background radiation in the vicinity of the borehole 104. This log can be obtained e.g. as a result of a separate or concurrent logging operation performed using a spectral gamma logging tool.

Apparatus for carrying out the method described above is as disclosed herein. Although the logging tool 100 is illustrated in FIGS. 2 to 6 as including the parts needed to carry a basic version of the method into effect, practical apparatus according to the disclosure hereof is likely to include one or more sources of at least one constraining log signal representing one or more constraining logs, such that the programmable device additionally may use the at least one constraining log signal to generate one or more first formation mineral and fluid concentration data set signal. The one or more sources of at least one constraining log signal representing one or more constraining logs may include one or more further logging tool, logging tool sub or logging tool assembly that in a typical case would for part of a logging tool string including the logging tool 100. However in other embodiments one or more separate sources of the constraining logs may be provided.

The further logging tool, logging tool sub or logging tool assembly typically but not necessarily is capable of generating one or more signal selected from the list comprising formation log density signals, apparent neutron porosity signals, photoelectric absorption factor (Pe) signals, formation Sigma signals, natural radiation signals indicative of radiation occurring naturally in the rock; resistivity signals, spectral gamma ray signals, acoustic slowness signals, rock physics model signals modeling rock acoustic behavior, core data signals and cuttings data signals.

Apparatus disclosed herein may include a non-transitory computer medium having program instructions stored thereon to cause the programmable device to complete one or more of the processing steps summarized above. Non-limiting examples of non-transitory memory or other computer medium types are given herein.

The disclosure hereof extends to wireline 108 operatively connecting the first logging tool or logging tool assembly 100 to the one or more programmable device. Also the disclosed apparatus may include or be operatively connected to one or more of a plotter, printer, display or memory. As a result the output signals 607 of the method may be displayed in any of a variety of ways that are of use to those familiar with log interpretation. Also it is possible to store, transmit and otherwise process the output log signals 607.

The disclosure extends to a borehole-apparatus system including borehole 104 penetrating subterranean rock and having moveably inserted therein the first logging tool or logging tool assembly constituting or forming part of apparatus according to the present disclosure. In the majority of instances the borehole would penetrate a region of rock such as region 106 that in some way is geologically of interest to professionals charged with determining subterranean chemistry and conditions. The borehole of such a system may have moveably inserted therein the further logging tool or logging tool assembly of a kind that is suitable for generating the one or more constraining log signal referred to herein.

Embodiments disclosed herein provide numerous unexpected advantages over the prior art, as explained. In particular the ambiguities and errors apparent in prior art nuclear spectroscopy logging are avoided, by reason of the single-solver approach described herein. Furthermore the method of the invention makes clearer to human interpreters of the generated logs any areas of uncertainty, with the result that these may be identified and/or further processed as desired.

Disclosed herein are novel apparatuses and systems, as described; and the processing of log signals to novel forms also as described.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A method of logging subterranean rock, the method comprising the steps of:
   a. generating or selecting, in a processing system, one or more formation model signals representing a formation model listing one or more fluids and minerals assumed to be present in the subterranean rock;
   b. using the one or more formation model signals to generate, in the processing system, one or more first formation mineral and fluid concentration data set signals;
   c. calculating, in the processing system, from the one or more first formation mineral and fluid concentration data set signals, one or more first elemental concentration signals representing a first simulated log of first elemental concentrations in the subterranean rock;
   d. forward modeling, in the processing system, from the one or more first elemental concentration signals, one or more first simulated energy spectrum signals and simulating one or more first simulated constraining log signals;
   e. operating one or more neutron logging tools in a borehole penetrating the subterranean rock to detect gamma radiation, generating one or more spectrum signals, representing one or more spectra, from the detection of the gamma radiation, and generating one or more generated constraining log signals representing one or more constraining logs;
   f. comparing, in the processing system, the one or more spectrum signals and the one or more first simulated energy spectrum signals, determining a first resultant error and generating one or more first error signals indicative thereof;
   g. comparing, in the processing system, the one or more generated constraining log signals and the one or more first simulated constraining log signals, determining a second resultant error and generating one or more second error signals indicative thereof;
   h. using the one or more formation model signals to generate, in the processing system, at least one second formation mineral and fluid concentration data set signal;
   i. calculating, in the processing system, from the at least one second formation mineral and fluid concentration data set signal, at least one second elemental concentration signal representing a second simulated log of second elemental concentrations in the subterranean rock;
   j. forward modeling, in the processing system from the at least one second elemental concentration signal, one or more second simulated energy spectrum signals and further simulating one or more second simulated constraining log signals;
   k. comparing, in the processing system, the one or more spectrum signals and the one or more second simulated energy spectrum signals, determining a third resultant error, and generating one or more third error signals indicative thereof;
   l. comparing, in the processing system, the one or more generated constraining log signals and the one or more second simulated constraining log signals, determining a fourth resultant error, and generating one or more fourth error signals indicative thereof;
   m. selecting, in the processing system, a formation mineral and fluid concentration data set signal that results in a minimal error signal respectively between steps f. and k. and steps g. and l.; and n. determining, in the processing system, component weight and/or volume fractions of the subterranean rock by generating one or more output signals indicating the selected formation mineral and fluid concentration data set signal.

2. The method according to claim 1 wherein the one or more generated constraining log signals, the one or more first simulated constraining log signals, and the one or more second simulated constraining log signals include one or more signals selected from a list comprising formation log density signals, apparent neutron porosity signals, photoelectric absorption factor (Pe) signals, formation sigma signals, natural radiation signals indicative of radiation occurring naturally in the subterranean rock; resistivity signals, spectral gamma ray signals, acoustic slowness signals, rock physics model signals modeling rock acoustic behavior, core data signals and cuttings data signals.

3. The method according to claim 1 wherein the one or more generated constraining log signals, the one or more first simulated constraining loci signals, and the one or more second simulated constraining log signals include one or more signals selected from a list comprising formation log density signals, apparent neutron porosity signals, photoelectric absorption factor (Pe) signals, formation sigma signals, natural radiation signals indicative of radiation occurring naturally in the subterranean rock; resistivity signals, spectral gamma ray signals, acoustic slowness signals, rock physics model signals modeling rock acoustic behavior, core data signals and cuttings data signals; and the method including a step of generating one or more neutron slowing down signals and one or more diffusion length signals, and deriving the apparent neutron porosity signals therefrom.

4. The method according to claim 1 wherein the one or more generated constraining log signals, the one or more first simulated constraining loci signals, and the one or more second simulated constraining log signals include one or more signals selected from a list comprising formation log density signals, apparent neutron porosity signals, photoelectric absorption factor (Pe) signals, formation sigma signals, natural radiation signals indicative of radiation occurring naturally in the subterranean rock; resistivity signals, spectral gamma ray signals, acoustic slowness signals, rock physics model signals modeling rock acoustic behavior, core data signals and cuttings data signals; and the method including a step of deriving, from one or more spectral gamma ray signals, one or more signals indicative of presence of Potassium, Uranium and/or Thorium ions in the subterranean rock.

5. The method according to claim 1 wherein the one or more spectrum signals include one or more of a burst spectrum signal and a capture spectrum signal.

6. The method according to claim 1 wherein the one or more spectrum signals include one or more of a burst spectrum signal and a capture spectrum signal; and the method including a step of causing the one or more neutron logging tools in the borehole penetrating the subterranean rock to emit one or more neutron bursts, wherein the burst spectrum signal derives from detection of gamma radiation in a first time period after a beginning of the one or more neutron bursts.

7. The method according to claim 1 wherein the one or more spectrum signals include one or more of a burst spectrum signal and a capture spectrum signal, the method including a step of causing the one or more neutron logging tools in the borehole penetrating the subterranean rock to emit one or more neutron bursts, wherein the burst spectrum signal derives from detection of gamma radiation in a first time period after a beginning of the one or more neutron bursts; and wherein the capture spectrum signal derives from gamma radiation detected in a second time period after the one or more neutron bursts.

8. The method according to claim 1 including a step of moving the one or more neutron logging tools to a plurality of logging depths along the borehole penetrating the subterranean rock, and repeating at least steps a. to l. in respect of the plurality of the logging depths.

9. The method according to claim 1 including a step of moving the one or more neutron logging tools to a plurality of logging depths along the borehole penetrating the subterranean rock; repeating at least steps a. to l. in respect of the plurality of the logging depths; and the method including a step of o. generating a wellbore log comprising or derived from a plurality of the one or more output signals generated at step n. in respect of the plurality of logging depths.

10. The method according to claim 1 wherein at least step f. is carried out using a programmable device supported by or forming part of the one or more neutron logging tools.

11. The method according to claim 1 wherein the processing system comprises one or more of processing equipment, a processing device at surface, a remote device, a computer, and a programmable device supported by or forming part of the one or more neutron logging tools.

12. An apparatus to log subterranean rock, the apparatus comprising:
a first logging tool including (i) a neutron source— configured to emit radiative neutron bursts; and (ii) one or more detectors of gamma radiation, the first logging tool being operable in a borehole penetrating the subterranean rock, the first logging tool being configured to detect gamma radiation following the emission of the radiative neutron bursts and being configured to generate one or more spectrum signals, representing one or more spectra, from the detection of the gamma radiation following the emission of the radiative neutron bursts;
the apparatus including or being operatively connected to a processing device being configured to:
  a. generate or select one or more formation model signals representing a formation model listing one or more fluids and minerals assumed to be present in the subterranean rock;
  b. use the one or more formation model signals to generate one or more first formation mineral and fluid concentration data set signals;
  c. calculate, from the one or more first formation mineral and fluid concentration data set signals, one or more first elemental concentration signals representing a first simulated log of elemental concentrations in the subterranean rock;
  d. forward model, from the one or more first elemental concentration signals, one or more first simulated energy spectrum signals and one or more first simulated constraining log signals;
  e. generate, from the one or more spectrum signals representing the one or more spectra, one or more constraining log signals representing one or more constraining logs;
  f. compare the one or more spectrum signals and the one or more first simulated energy spectrum signals, determine a first resultant error, and generate one or more first error signals indicative thereof;
  g. compare the one or more constraining log signals and the one or more first simulated constraining log signals, determine a second resultant error, and generate one or more second error signals indicative thereof;

h. use the one or more formation model signals to generate at least one further formation mineral and fluid concentration data set signal;

i. calculate, from the at least one further formation mineral and fluid concentration data set signal, a further elemental concentration signal representing a further simulated log of elemental concentrations in the subterranean rock;

j. forward model, from the further elemental concentrations signal, one or more further simulated energy spectrum signals and one or more further simulated constraining log signals;

k. compare the one or more spectrum signals and the one or more further simulated spectrum signals, determine a third resultant error, and generate one or more third error signals indicative thereof;

l. compare the one or more constraining log signals and the one or more further simulated constraining log signals, determine a fourth resultant error, and generate one or more fourth error signals indicative thereof; and m. select one formation mineral and fluid concentration data set signals that results in a minimal error signal respectively between steps f. and k. and steps g. and l. to determine component weight and/or volume fractions of the subterranean rock.

13. The apparatus according to claim 12 including one or more sources of at least one constraining log signal of the one or more constraining log signals, wherein the processing device additionally uses the at least one constraining log signal to generate the one or more first formation mineral and fluid concentration data set signals.

14. The apparatus according to claim 12 including one or more sources of at least one constraining log signal of the one or more constraining log signals, wherein the processing device additionally uses the at least one constraining log signal to generate the one or more first formation mineral and fluid concentration data set signals; and wherein the one or more sources of the at least one constraining log signal includes one or more further logging tools configured to generate the at least one constraining log signal.

15. The apparatus according to claim 12 including one or more sources of at least one constraining log signal of the one or more constraining log signals, wherein the processing device additionally uses the at least one constraining log signal to generate the one or more first formation mineral and fluid concentration data set signals; wherein the one or more sources of the at least one constraining log signal includes one or more further logging tools configured to generate the at least one constraining log signal; and wherein the first logging tool and the one or more further logging tools are mutually joined to form a common logging tool assembly.

16. The apparatus according to claim 12 including one or more sources of at least one constraining log signal of the one or more constraining log signals, wherein the processing device additionally uses the at least one constraining log signal to generate the one or more first formation mineral and fluid concentration data set signals; wherein the one or more sources of the at least one constraining log signal includes one or more further logging tools configured to generate the at least one constraining log signal; and wherein the one or more further logging tools are configured to generate one or more signals selected from a list comprising formation log density signals, apparent neutron porosity signals, photoelectric absorption factor (Pe) signals, formation sigma signals, natural radiation signals indicative of radiation occurring naturally in the subterranean rock; resistivity signals, spectral gamma ray signals, acoustic slowness signals, rock physics model signals modeling rock acoustic behavior, core data signals and cuttings data signals.

17. The apparatus according to claim 12 including a non-transitory computer medium having program instructions stored thereon to cause the processing device to complete one or more processing steps.

18. The apparatus according to claim 12 including wireline operatively connecting the first logging tool to the processing device.

19. The apparatus according to claim 12 wherein the apparatus includes or is operatively connected to one or more of a plotter, a printer, a display, or a memory.

20. A borehole-apparatus system including the borehole penetrating the subterranean rock and having moveably inserted therein the first logging tool constituting or forming part of the apparatus according to claim 12.

21. The borehole-apparatus system according to claim 20 having moveably inserted therein a further logging tool constituting or forming part of the apparatus.

22. The apparatus according to claim 12 wherein the first logging tool comprises a neutron logging tool, a logging tool sub, or a logging tool assembly; and wherein the processing device comprises one or more of processing equipment, a processing system at surface, a remote device, a computer, and a programmable device supported by or forming part of the first logging tool.

* * * * *

UNITED STATES PATENT AND TRADEMARK OFFICE
CERTIFICATE OF CORRECTION

| | | |
|---|---|---|
| PATENT NO. | : 11,693,147 B2 | Page 1 of 1 |
| APPLICATION NO. | : 16/862334 | |
| DATED | : August 14, 2018 | |
| INVENTOR(S) | : Whetton | |

It is certified that error appears in the above-identified patent and that said Letters Patent is hereby corrected as shown below:

On the Title Page

Item [73] should read Reeves Wireline Technologies Limited Leicestershire, United Kingdom Signed and Sealed this
Twenty-fifth Day of July, 2023

Katherine Kelly Vidal
*Director of the United States Patent and Trademark Office*